US009939797B2

(12) United States Patent
Tanaka et al.

(10) Patent No.: US 9,939,797 B2
(45) Date of Patent: Apr. 10, 2018

(54) MOTOR CONTROL PROGRAM TRANSFERRING SYSTEM, HOST CONTROLLER, MOTOR CONTROL DEVICE, AND MOTOR CONTROL PROGRAM TRANSFERRING METHOD

(71) Applicant: KABUSHIKI KAISHA YASKAWA DENKI, Kitakyushu-shi (JP)

(72) Inventors: Yusuke Tanaka, Kitakyushu (JP); Hirotaka Niimi, Kitakyushu (JP); Tatsuhiko Satou, Kitakyushu (JP); Tadashi Okubo, Kitakyushu (JP); Isamu Matsumura, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 0 days.

(21) Appl. No.: 15/140,190

(22) Filed: Apr. 27, 2016

(65) Prior Publication Data
US 2016/0239008 A1 Aug. 18, 2016

Related U.S. Application Data

(63) Continuation of application No. PCT/JP2013/079272, filed on Oct. 29, 2013.

(51) Int. Cl.
G05B 19/18 (2006.01)
G05B 19/042 (2006.01)

(52) U.S. Cl.
CPC .. *G05B 19/042* (2013.01); *G05B 2219/23296* (2013.01)

(58) Field of Classification Search
USPC ........ 318/568.1, 568.23; 370/486, 383, 475; 711/103, 3, 6, 108
See application file for complete search history.

(56) References Cited

U.S. PATENT DOCUMENTS 5,636,341 A * 6/1997 Matsushita ......... G06F 11/1438
340/2.7
5,832,486 A * 11/1998 Itoh ..................... G06F 11/1076
707/741

(Continued)

FOREIGN PATENT DOCUMENTS

JP 09211101 A * 8/1997
JP 2000-207228 A 7/2000

(Continued)

OTHER PUBLICATIONS

English translation of the International Preliminary Report on Patentability and Written Opinion dated May 12, 2016 in PCT/JP2013/079272.

(Continued)

*Primary Examiner* — Jorge L Carrasquillo
(74) *Attorney, Agent, or Firm* — Oblon, McClelland, Maier & Neustadt, L.L.P.

(57) ABSTRACT

A motor control program transferring system includes: an upper control device including a memory storing motor control program(s) that are executable on motor control device(s) and circuitry which performs assigning operation (s) that assigns unique identification information to the motor control device(s) and transfers the motor control program(s) to the respective motor control device(s) to which the respective unique identification information has been assigned; motor control device(s) which communicates with the upper control device, the motor control device(s) each including a volatile memory, and a storage; and switching circuitry which enables communication between a first one of the motor control devices and the upper control device during initial state and switch on communication between a second one of the motor control devices and the upper control device after a respective unique identification (Continued)

information is assigned to the first motor control device. The motor control devices each having initially designated identification information.

11 Claims, 7 Drawing Sheets

(56) References Cited

U.S. PATENT DOCUMENTS

| | | | |
|---|---|---|---|
| 2002/0049822 A1* | 4/2002 | Burkhardt | G06F 15/17 709/208 |
| 2003/0048474 A1* | 3/2003 | Hong | B65H 3/44 358/1.15 |
| 2014/0152096 A1 | 6/2014 | Nagatsuka | |

FOREIGN PATENT DOCUMENTS

| | | | | |
|---|---|---|---|---|
| JP | 2000-295894 A | 10/2000 | | |
| JP | 2001-159933 A | 6/2001 | | |
| JP | 2001159933 A | * 6/2001 | ........... | G05B 19/042 |
| JP | 2007-293532 A | 11/2007 | | |
| JP | 2013-033347 A | 2/2013 | | |
| JP | 2013-073351 A | 4/2013 | | |
| WO | WO 2009/128216 | 10/2009 | | |

OTHER PUBLICATIONS

International Search Report dated Jan. 28, 2014 in PCT/JP2013/079272 filed Oct. 29, 2013 (with English Translation).
Written Opinion dated Jan. 28, 2014 in PCT/JP2013/079272 filed Oct. 29, 2013.
Office Action dated Jul. 25, 2017, in Japanese Patent Application No. 2015-544673 (with English-language Translation).

* cited by examiner

MOTOR CONTROL PROGRAM TRANSFERRING SYSTEM, HOST CONTROLLER, MOTOR CONTROL DEVICE, AND MOTOR CONTROL PROGRAM TRANSFERRING METHOD

CROSS-REFERENCE TO RELATED APPLICATIONS

The present application is continuation of and claims the benefit of priority to International Application No. PCT/JP2013/079272, filed Oct. 29, 2013, the entire contents of which are incorporated herein by reference.

BACKGROUND OF THE INVENTION

Field of the Invention

The present invention relates to a motor control transferring system, host controller, motor control device, and a motor control program transferring method.

Description of Background Art

JP 2001-159933 A describes a method and a device for initializing sub-control devices connected to a downstream of a main control device. In JP 2001-159933 A, the main control device repeats a process of interrupting the voltage supply to all other sub-control devices substantially at the same time as maintenance of the voltage supply to the sub-control device to be initialized among the sub-control devices connected to the main control device, and a process of transmitting an initialization signal to the sub-control device to be initialized, as necessary. The entire contents of this publication are incorporated herein by reference.

SUMMARY OF THE INVENTION

According to one aspect of the present invention, a motor control program transferring system includes: an upper control device including a memory storing one or more motor control programs that are respectively executable on one or more motor control devices, and circuitry which performs one or more assigning operations that respectively assign unique identification information to the one or more motor control devices, the one or more motor control devices each having initially designated identification information, and transfer the one or more motor control programs to the respective one or more motor control devices to which the respective unique identification information has been assigned; the one or more motor control devices which communicates with the upper control device, the one or more motor control devices each including a volatile memory storing the respective motor control program, and a storage retaining identification information that identifies the respective motor control device in a rewritable manner including initially retaining the respective initially designated identification information; and switching circuitry which enables communication between a first one of the one or more motor control devices and the upper control device at least during an initial state and switch on communication between a second one of the one or more motor control devices and the upper control device after a respective unique identification information is assigned to the first one of the one or more motor control devices.

According to another aspect of the present invention, an upper controller for communicating with one or more motor control devices includes a memory storing one or more motor control programs that are respectively executable on the one or more motor control devices, and circuitry which performs one or more assigning operations that respectively assign unique identification information to the one or more motor control devices, the one or more motor control devices each having initially designated identification information, and transfers the one or more motor control programs to the respective one or more motor control devices to which the respective unique identification information have been assigned.

According to yet another aspect of the present invention, a motor control device for communicating with an upper control device includes a volatile memory storing a motor control program, and a storage retaining identification information that identifies the motor control device in a rewritable manner and including initially retaining initially designated identification information.

According to still another aspect of the present invention, a motor control program transferring method includes performing an operation of assigning unique identification information to one or more motor control devices each having initially designated identification information, switching on communication for remaining ones of the one or more motor control devices after the assigning of the respective unique identification information to each of the remaining one of the one or more motor control devices, a first one of the one or motor control devices having communication initially enabled, and transferring one or more motor control programs to the respective one or more motor control devices to which the respective unique identification information has been assigned.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

The embodiments will now be described with reference to the accompanying drawings, wherein like reference numerals designate corresponding or identical elements throughout the various drawings.

Figure 1:
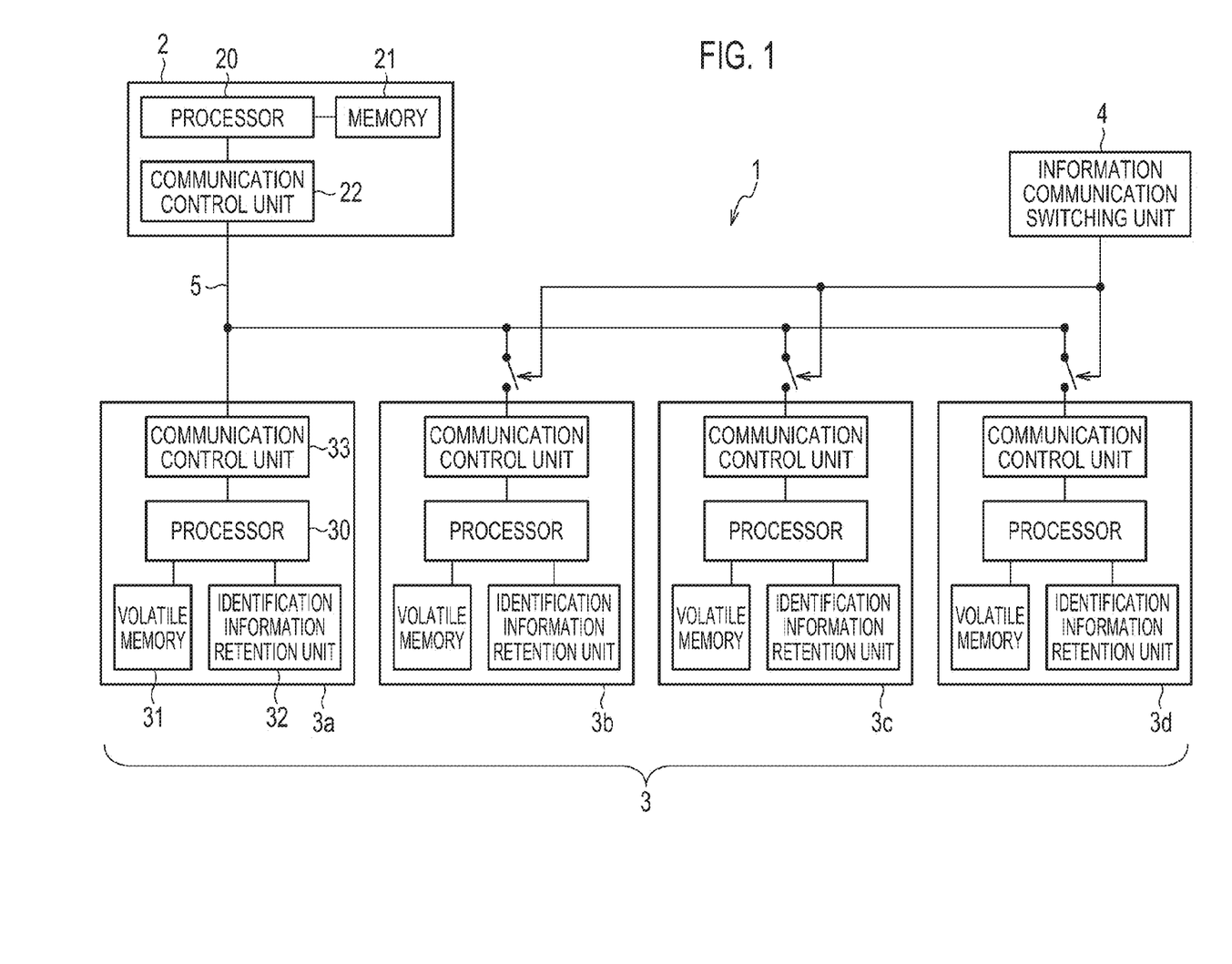
FIG. 1 is a block diagram illustrating a configuration of a motor control program transferring system, which is common to each embodiment of the present invention.

FIG. 1 is a block diagram illustrating a configuration of a motor control program transferring system 1, which is common to each embodiment, according to an embodiment of the present invention common to each embodiment described below.

The motor control program transferring system 1 has an upper controller 2, one or more, usually, multiple motor control devices 3 coupled to the upper controller 2 via an information communication line 5 in an information-communicable manner, and an information communication switching unit 4. Here, a case where four motor control devices (3a to 3d) are connected to the upper controller 2 is illustrated as an example.

The upper controller 2 controls the operation of the entire system including the motor controlled by the motor control device 3, and transmits an operation command to each of the motor control devices 3 at a predetermined timing or receives an error signal and other state signals from the motor control devices 3. The upper controller 2 includes a processor 20, and the function of the upper controller 2 is achieved by executing the software through the processor 20. The processor 20 may be a general computer including a central processing unit (CPU) and a memory, and arbitrary information processing apparatus such as a micro control unit or a field programmable gate array (FPGA).

Further, a memory 21 is provided in the upper controller 2, and a motor control program to be executed by a processor 30 of the motor control device 3 to be described below is stored in the upper controller. Although the form of the memory 21 is not particularly limited, a form that is capable of being rewritten to allow the updating of the motor control program is desirable and that does not lose the stored contents at the time of interruption of the power supply to the upper controller 2 is desirable. Thus, an electrically erasable programmable read-only memory (EEPROM), such as a so-called flash memory, is desirable. However, this does not preclude the memory 21 from being a read-only memory (ROM) incapable of being rewritten or being a volatile memory such as a random access memory (RAM).

Further, the upper controller 2 is provided with a communication control unit 22, so that the information communication with the motor control device 3 and the information communication and input-output with other devices are performed. The configuration of the communication control unit 22 is also not particularly limited, and for example, a general communication integrated circuit having an application specific integrated circuit (ASIC) or the like may be used.

The upper controller 2 is typically connected to an external programmable logic controller (PLC) and a computer (not illustrated) to control the respective motor control devices 3 depending on a command from such a device. Here, the "host" in the term "upper controller" is used to indicate its role, as a part of the motor control program transferring system 1, in transferring the motor control program to each of the motor control devices (3a to 3d) by the connection of one or more motor control devices (3a to 3d) or in indicating the control timing, and the term does not limit the performance and form of the device.

The motor control device 3 is connected to a motor (not illustrated) and controls the motor by a motor control program performed by the processor 30 included in the motor control device 3. The processor 30 controls an amplifier that outputs a current, a voltage, and the like to the motor. Although a motor control device that controls a servo motor is referred to as a servo controller or a servo amplifier. Since the motor in the present embodiment includes a servo motor, the motor control device 3 includes a servo controller. Further, the processor 30 may be a general computer including a CPU and a memory or a general-purpose information processing apparatus, such as a micro control unit, similarly to the processor 20 of the upper controller 2. Alternatively, it may be an application specific information processing apparatus such as an FPGA, an ASIC, and a DSP.

The motor control program executed by the processor 30 is stored in the volatile memory 31. The reason is that the processor 30 may execute the motor control program in a short operation cycle so as to precisely control the motor, and the non-volatile memory, such as an EEPROM, that generally has a low read speed of information is not suitable as the memory that stores the motor control program. Here, several tens of microseconds are assumed as the operation cycle of the processor 30. In contrast, the operation cycle of the processor 20 of the upper controller 2 is assumed to be from about several hundreds of microseconds to several milliseconds.

Here, the motor control program includes, for example, an algorithm that generates a current and a voltage for driving the motor connected to the motor control device 3, and an electronic data that describes the response of the motor control device 3 to the input from the upper controller 2 and the operation of the motor control device 3 depending on the state of the motor. Furthermore, the motor control program may include the pattern of the operation executed on the motor by the motor control device 3, and in that case, the motor control device 3 can autonomously operate the motor in a predetermined pattern, without receiving the continuous timing command from the upper controller 2.

The volatile memory 31 is a memory that stores a motor control program and is a general RAM. Since the volatile memory 31 is volatile when the power source of the motor control device 3 is lost, the stored contents of the volatile memory are lost. Therefore, immediately after turning on the motor control device (which is referred to as an initial state), the motor control program is lost and it is necessary to write it by some means.

An identification information retention unit 32 is a unit that retains the identification information for identifying the individual motor control devices 3 by the upper controller 2 on performing the information communication. Although the specific configuration of the identification information retention unit 32 is not particularly limited, at least the retained identification information is electrically rewritable. Specifically, it is preferable that a specific address of the volatile memory 31 may be reserved as the identification information retention unit 32. Further, the identification information retention unit 32 retains specific identification information (this is referred to as the initial identification information) in the initial state. For this purpose, for example, the initial identification information may preferably be written in the identification information retention unit 32 by the boot program on a ROM (not illustrated) executed immediately after the input of the power of the motor control device 3. In the following example, the identification information is 8-bit information, and the initial identification information is assumed to be 0xEF in hexadecimal notation. Further, the identification information of the upper controller 2 is kept as a predetermined fixed value, for example, 0x00.

Further, the motor control device 3 has a communication control unit 33, such that the information communication and the input and output with the upper controller 2 are performed. The communication control unit 33 may also be, for example, a communication integrated circuit including the ASIC or the like.

Further, the motor control program transferring system 1 has an information communication switching unit 4. The information communication switching unit 4 can individually enable or disable the information communication between the upper controller 2 and each of the motor control devices 3. Precisely, the information communication between the upper controller 2 and one of the motor control devices 3, here, the motor control device (3*a*) may be enabled at all times. Thus, in the illustrated example, although the information communication switching unit 4 is adapted to switch between enabling and disabling the information communication between the information communication switching unit 4 and the motor control devices (3*b* to 3*d*), the information communication switching unit 4 may also be adapted to switch enabling and disabling the communication information in the motor control device (3*a*).

Here, the information communication refers to a communication type for performing the information transfer in accordance with a predetermined protocol. The type of information communication may be a serial communication and may be a parallel communication, and the connection from the upper controller 2 to each motor control device 3 may be a so-called star connection or a cascade connection. Although FIG. 1 illustrates the star connection, that is, a configuration in which the upper controller 2 and the motor control device 3 are directly connected to each other as if the direct communication is performed therebetween, this is merely illustrated for convenience, and merely conceptually illustrates a configuration in which the information communication line 5 communicably connects the upper controller 2 and each motor control device 3. Of course, the connection may be a cascade connection (or a daisy-chain connection) and may be other connections.

Here, when the connection between the upper controller 2 and the motor control device 3 is a cascade connection, the motor control device (3*a*) in which the information communication is enabled at all times is initially connected to the upper controller 2, and a single motor control device (3*a*) of the initial state can communicate information with the upper controller 2. Further, if the cascade connection of the motor control devices (3*a* to 3*d*) is performed in this order, the motor control device 3*b* is connected to the upper controller 2 via the motor control device (3*a*), the motor control device (3*c*) is connected to the upper controller 2 via the motor control device (3*b*) and the motor control device (3*a*), and the motor control device (3*d*) is connected to the upper controller 2 via the motor control device (3*c*), the motor control device (3*b*) and the motor control device (3*a*).

Therefore, in the cascade connection, the communication between the specific motor control device 3 and the upper controller 2 is performed by sequentially transferring another motor control device 3 interposed therebetween. Accordingly, when interposing the more motor control devices 3, a longer communication time is required. For example, in the above-described embodiment, the communication time between the motor control device (3*d*) and the upper controller 2 becomes longer than the communication time between the motor control device (3*a*) and the upper controller 2, since there is a need for a time of transfer to each of the motor control device (3*c*), the motor control device (3*b*) and the motor control device (3*a*). In an embodiment of the present invention described below, the cascade type is illustrated as the connection between the upper controller 2 and the motor control device 3. Further, the information communication line 5 used in the information communications herein includes a radio line, without being limited to a wired line.

In some case, the upper controller 2 physically takes charge of the function of the information communication switching unit 4, and the motor control device 3 takes charge of its function of the information communication switching unit 4 as a whole. Therefore, in FIG. 1, only the function is taken out by being abstracted and is illustrated as the information communication switching unit 4. An example achieved by the information communication switching unit 4 through a particular device is illustrated in the embodiment described below.

Figure 2:
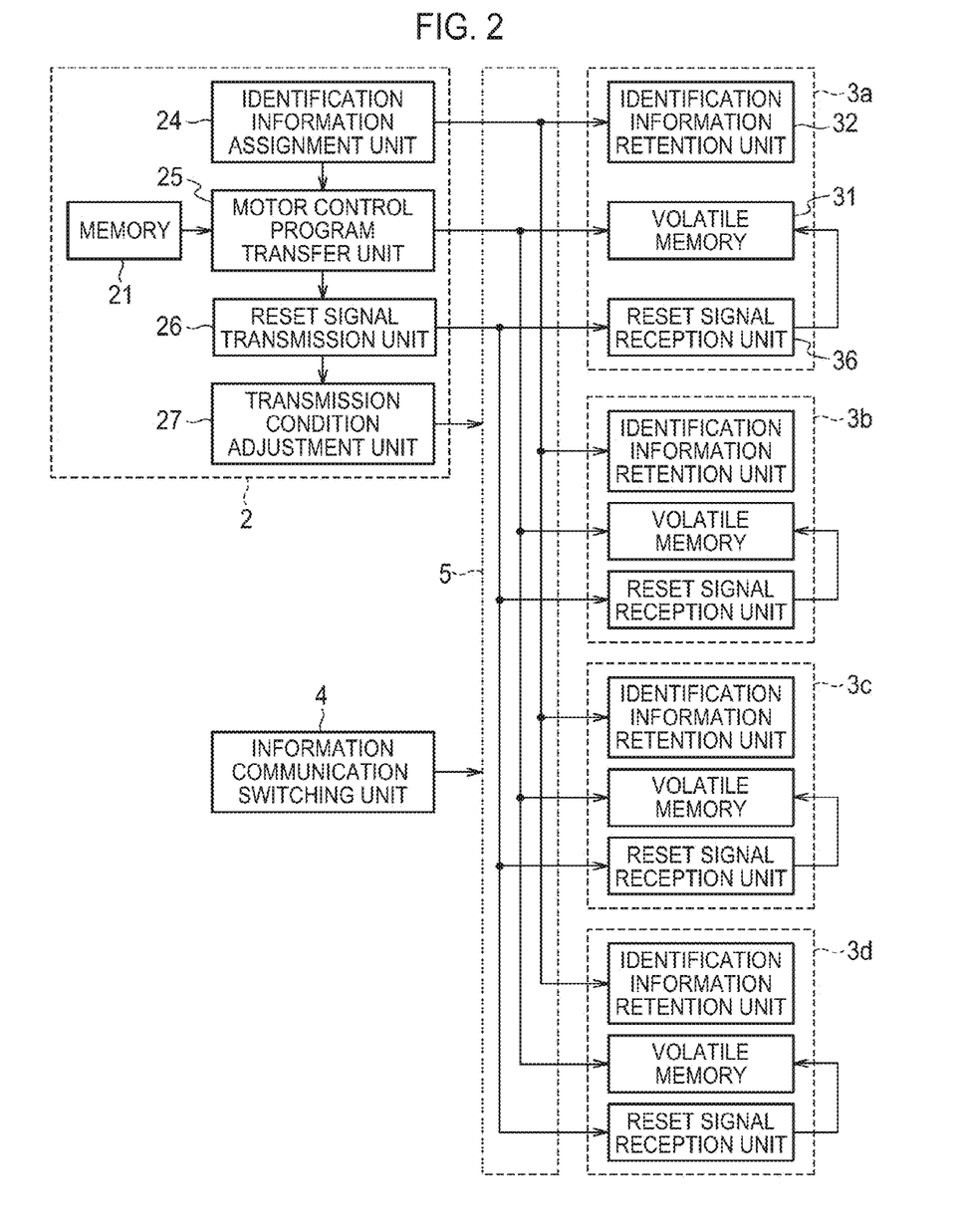
FIG. 2 is a functional block diagram of the motor control program transferring system.

FIG. 2 is a functional block diagram of a motor control program transferring system 1.

The upper controller 2 includes an identification information assignment unit 24, a motor control program transferring unit 25, a reset signal transmission unit 26 and a communication condition adjustment unit 27, in addition to the memory 21 described above. Here, the identification information assignment unit 24, the motor control program transferring unit 25, the reset signal transmission unit 26 and the communication condition adjustment unit 27 virtually illustrate the function achieved by a program executed through the processor 20 (see FIG. 1). Further, the motor control device 3 has a reset signal reception unit, in addition to the identification information retention unit 32 and the volatile memory 31 mentioned above. The reset signal reception unit may be virtually by the program executed by a processor 30 (see FIG. 1) and may be a dedicated circuit for detecting the reset signal.

The identification information assignment unit 24 assigns the unique identification information, that is, the identification information which does not overlap between the different motor control devices 3, to the motor control device 3 having the initial identification information. The assigned unique identification information is retained in the identification information retention unit of the single motor control device 3. Further, the motor control program transferring unit 25 transfers the motor control program stored in the memory 21 to the motor control device 3 to which the unique identification information is assigned. The transferred motor control program is stored in the volatile memory 31 of the single motor control device 3. Further, the reset signal transmission unit 26 transmits a reset signal to the motor control device 3, after being performed as necessary from the transferring of the motor control program through the motor control program transferring unit 25. The reset signal is received by the reset signal reception unit 36 of the motor control device 3. The reset signal reception unit 36 resets the motor control device 3 when receiving the reset signal. That is, the reset signal reception unit 36 stops the execution of the program currently executed by the processor 30 (see FIG. 1) and causes the processor 30 to execute the motor control program stored in the volatile memory 31.

Further, in FIG. 2, the information communication switching unit 4 is illustrated as a unit appropriately and individually enabling or disabling the information communication line 5 illustrated by broken lines. Further, the information communication line 5 of FIG. 2 also conceptually illustrates the communicable connection between the upper controller 2 and the motor control device 3, similarly to FIG. 1, and an aspect of the connection (the star connection, the cascade connection, or other connections) is not limited.

In the motor control program transferring system 1 having the above configuration, as an example of the condition for transferring the motor control program to one or more motor control devices 3, the initialization of the initial state, that is, the procedure for transferring the motor control program to all the motor control devices 3 will be described with reference to FIG. 3.

Figure 3:
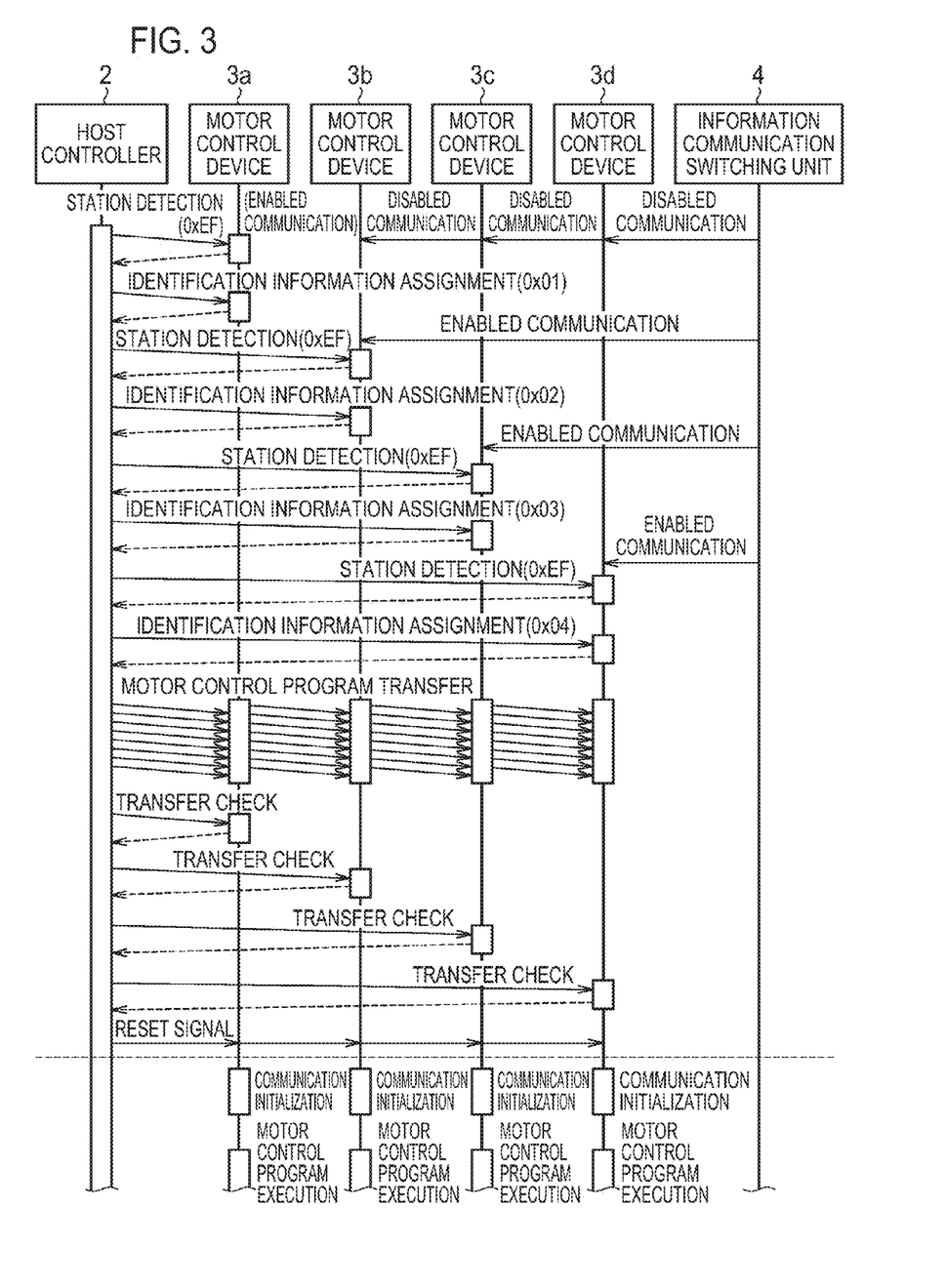
FIG. 3 is a diagram illustrating an operation flow of the motor control program transferring system.

FIG. 3 is a diagram illustrating an operation flow of the motor control program transferring system 1. FIG. 3 illustrates the operation and the communication from the initial state of each device illustrated in FIGS. 1 and 2 along the time series, and the time is illustrated as traveling toward the downward direction in FIG. 3. Further, the states of each device are indicated by a white box in the case of performing some operation and are indicated by a line in the case of waiting. Solid arrows in FIG. 3 indicate the information communication or signal, and dashed arrows indicate the response to the information communication.

First, in the initial state, by the information communication switching unit 4, the single motor control device 3, that is, only the motor control device (3a) is enabled for information communication, and other motor control devices (3b to 3d) are disabled for information communication. In this state, the upper controller 2 sends the station detection signal of 0xEF that is the initial identification information. Since only the motor control device (3a) enabled for information communication can detect and respond to the station detection signal, the motor control device 3 sends the response signal to the upper controller 2.

When receiving the response signal, the upper controller 2 assigns the unique identification information to the motor control device (3a) having the initial identification information 0xEF, by the identification information assignment unit 24. Here, a serial number is assigned as the identification information, and 0x01 as its value is assigned to the motor control device (3a). The motor control device (3a) receiving the identification information writes such identification information on the identification information retention unit 32, and updates the own identification information from the initial identification information.

After that, the information communication switching unit 4 enables the information communication of the next single motor control device (3b). At this time, the identification information of the motor control device (3a) is 0x01 after rewriting, and the identification information of the motor control device (3b) is 0xEF that is the initial identification information.

The upper controller 2 also repeats the same operation, which is performed on the motor control device (3a), on the motor control device (3b). That is, at this time, the station detection signal is sent to the motor control device (3b) having the initial identification information 0xEF. When receiving the response signal, the unique identification information, here, 0x02 is assigned. The similar operation is also repeated on the motor control devices (3c, 3d), and the identification information of the motor control device (3c) and the identification information of the motor control device (3d) are rewritten to 0x03 and 0x04, respectively. At this point, the information communication of all the motor control devices 3 is enabled.

After assigning the unique identification information to all the motor control devices 3, the upper controller 2 transfers the motor control program to all the motor control devices 3 by the motor control program transferring unit 25. Although the transfer also depends on the type of information communication, it is preferred to simultaneously perform the data transfer on the motor control devices 3 by a so-called broadcast or a method equivalent thereto. If it is enough that the motor control program is simply transferred to each motor control device 3, the motor control program may be individually transferred before or immediately after assigning the unique identification information. However, in that case, since there is a need for a communication time as much as a value obtained by multiplying the time required for transferring the motor control program by the number of the motor control devices 3, the termination time of the entire transfer becomes longer. In the case of the broadcast transferring, the number of transfer is only once, and the transfer is completed in a short period of time.

Further, the determination as to whether to assign unique identification information to all the motor control devices 3, for example, may be performed by determining that the assignment of the identification information is completed by no response to the station detection signal of 0xEF that is the initial identification information from the upper controller 2. Alternatively, the number of the motor control devices 3 connected to the upper controller 2 is manually or automatically assigned in advance, the same identification information is not assigned to the number of the motor control device 3, and thus the determination may be performed by determining the completion of the assignment of the identification information.

After the completion of transferring of the motor control program, if necessary, the upper controller 2 transmits a checking signal for checking whether the motor control program is normally transferred to each of the motor control devices 3 and is written in the volatile memory. Each motor control device 3 checks whether the motor control program is normally written in the volatile memory 31 with respect to the checking signal, and transmits the result to the upper controller 2. This check may be any type of check, for example, a sum check using a check sum or cyclic redundancy check (CRC) on the motor control program on the volatile memory 31.

When the upper controller 2 receives the result in which the motor control program is not normally written from a certain motor control device 3, the upper controller 2 transmits the motor control program to the motor control device 3 again by the motor control program transferring unit 25. After the retransmission, the checking signal is transmitted to the motor control device 3, and the same processing is repeated. Thus, the motor control program is reliably transferred.

If the transferring of the motor control program to all or required motor control devices 3 is successfully completed, the upper controller 2 transmits the reset signal to each motor control device 3 by the reset signal transmission unit 26. The reset signal is a signal that causes each motor control device 3 to perform the execution start of the motor control program on the volatile memory 31. Further, in this embodiment, the reset signal is also a signal for initializing the information communication between the motor control device 3 and the upper controller 2.

In the initialization of the information communication, until the transmission of the reset signal, the information communication between the upper controller 2 and the motor control device 3 is performed by non-periodic communication. On the other hand, after the transmission of the reset signal, the initialization is performed to switch the information communication to be performed by the periodic communication. To be more specific on this point, at the time of initialization of the motor control device 3 until the delivery of the reset signal, the information amount of the motor control program to be transferred is large, and its magnitude is not necessarily clear. Thus, the communication efficiency is poor and an extra time is taken in the periodic communication. Therefore, it is advantageous to use the non-periodic communication. After the delivery of the reset signal, since each motor control device 3 controls the motor that is the physical mechanism, it is necessary to be aware whether the state of the motor is normal, and meanwhile, the amount of information used for single communication with the upper controller 2 is not so much. Therefore, it is advantageous to transmit the state of the motor from the motor control device 3 to the upper controller 2 by the periodic communication for each predetermined period of time. In FIG. 2, the timing of switching the non-periodic communication into the periodic communication is indicated by a broken line.

The periodic communication herein refers to a communication method for performing the information communication according to a predetermined format at predetermined intervals, and the non-periodic communication refers to the communication method in which the timing of the information communication is not necessarily defined. Further, in the periodic communication, the arbitrary information communication at the timing other than the information communication for each time may be performed.

Also, when transmitting the reset signal, the upper controller 2 may adjust the communication conditions for the periodic communication with the motor control device 3 by a communication condition adjustment unit 27. That is, the communication conditions for the periodic communication after the reset signal transmission are not always the same, and may be optimally varied by the conditions other than the configuration of the motor control program transferring system 1.

Here, the communication conditions, for example, are the communication cycle of the periodic communication and the information amount of the communication for each cycle. When the number of the motor control devices 3 connected to the upper controller 2 is large, in order to increase the amount of information indicating the state, the amount of information to be received by the upper controller 2 through the single communication increases. As a result, the time required for the single communication also increases. In such a condition, a configuration, in which the maximum number of the motor control devices 3 capable of being connected to the upper controller 2 is set in advance and the communication cycle is set to cope with the time when the maximum number of motor control device 3 are connected, is also conceivable. However, conversely, when a small number of motor control devices 3 is connected, the most communication time is wasted and the response speed of the communication is lowered. Since the communication condition adjustment unit 27 of the upper controller 2 adjusts the communication conditions for the periodic communication, depending on the configuration and other conditions for the motor control program transferring system 1 including the number of the connected motor control devices 3, it is possible to appropriately set the response speed of the constant period communication.

When a reset signal reception unit 36 of each motor control device 3 receives the reset signal, the reset signal reception unit 36 performs the initialization of the communications to switch the information communication into the periodic communication, and executes the motor control program on the volatile memory 31.

In the motor control program transferring system 1 that transfers the motor control program to the motor control device 3 by the above method, the memory 21 (see FIG. 1) for storing a motor control program does not need to be provided for each motor control device 3, but to be provided only in the upper controller 2. Therefore, the capacity of the memory 21 that needs to be secured for the entire system can be reduced. Further, in the above description, the description has been given of the case of performing the initialization of the motor control device 3, as an example. However, even in another case, for example, when the update of the motor control program is performed, the updated motor control program is automatically transferred to the required motor control device 3 only by rewriting the content of the memory 21 of the upper controller 2 and thus the updating of the motor control device 3 is easy. Furthermore, since the individual identification information is automatically assigned to multiple motor control devices 3, it is not necessary to set the identification information for each motor control device 3 by hand, and the addition and the reduction of the motor control device 3 are also easy.

Subsequently, an example of a specific configuration of the information communication switching unit 4 of the above-described motor control program transferring system 1 will be described as an embodiment.

First Embodiment

Figure 4:
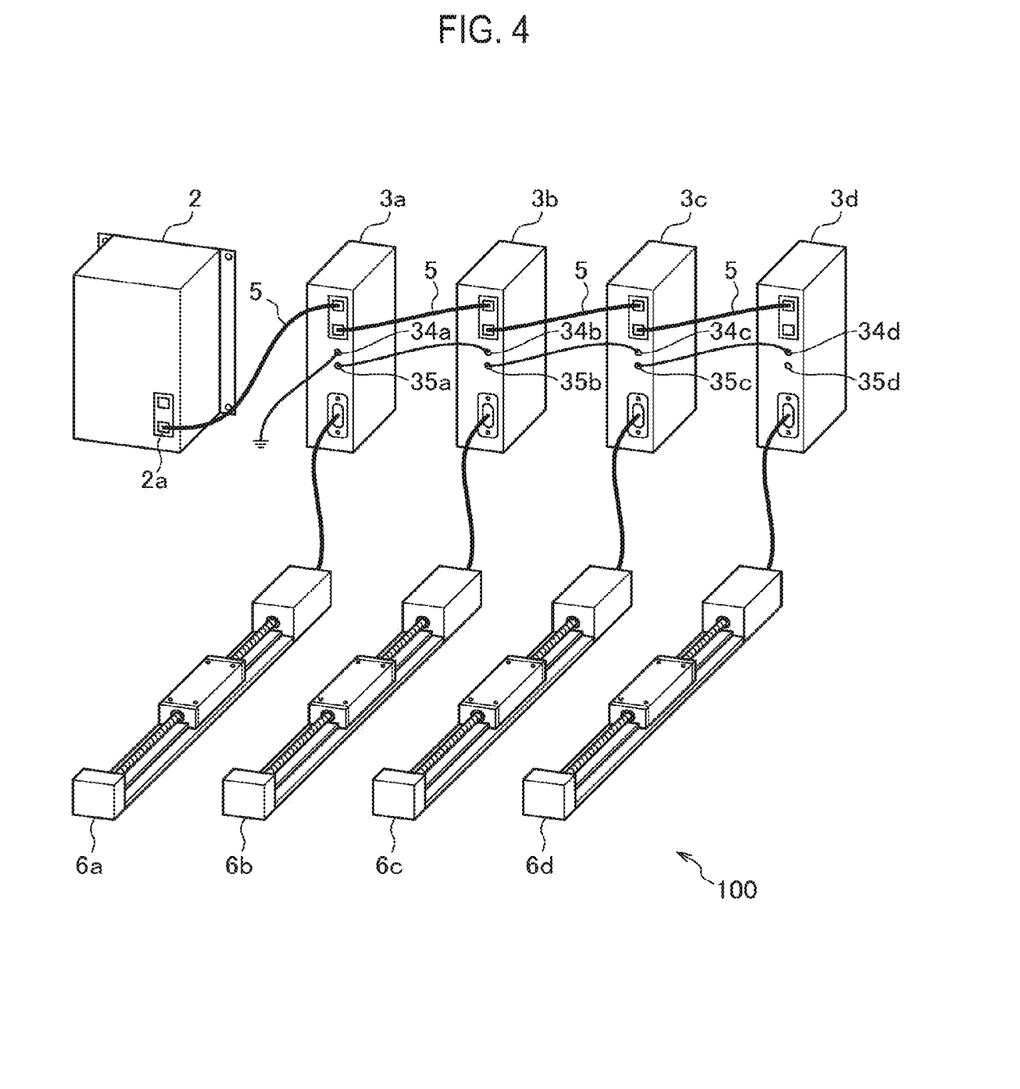
FIG. 4 is a diagram illustrating the motor control program transferring system according to a first embodiment of the present invention.

FIG. 4 is a diagram illustrating a motor control program transferring system 100 according to a first embodiment of the present invention. In the present embodiment, as illustrated, the motor control devices (3a, 3b, 3c, 3d) are cascade-connected to the upper controller 2 in this order by the information communication lines 5. Further, linear sliders (6a to 6d) driven by a servo motor are connected to the motor control devices (3a to 3d), respectively. In addition, the motor control devices (3a to 3d) include enable/disable input units (34a to 34d) and enable/disable output units (35a to 35d), respectively.

Here, each of the enable/disable input units (34a to 34d) is an input port that accepts the input as to whether the information communication to the upper controller 2 is enabled or disabled, and enables the information communication in a low-impedance (ground potential) in the illustrated example. Further, the enable/disable output units (35a to 35d) are output ports that output a signal to the enable/disable input units (34a to 34d), and are in a high impedance (disconnected) state in the initial state. Since the enable/disable input unit (34a) is grounded, the information communication of the motor control device (3a) is enabled at all times. In addition, since the enable/disable input units (34b to 34d) are respectively connected to the enable/disable output units (35a to 35c), the information communication of the motor control devices (3b to 3d) enabled or disabled by the adjacent motor control devices (3a to 3c) connected to the upper controller 2 side. That is, the motor control devices (3a to 3c) take charge of the information communication switching unit 4 of FIG. 1 in the present embodiment.

The operation of the motor control devices (3a to 3d) of the present embodiment is described below with reference to FIG. 3. In the initial state, the information communication of the motor control devices (3b to 3d) is disabled for communication by the output from the motor control devices (3a to 3c), respectively. Further, when the identification information is assigned by the upper controller 2, each of the motor control devices (3a to 3d) switches the output from the enable/disable output units (35a to 35c) into the low impedance, that is, into enabled communication. Thus, the motor control devices (3a to 3c) function as the information communication switching unit 4 of FIG. 1.

Since the enable/disable output unit (35d) of the motor control device (3d) is not particularly connected to another device, the motor control device (3d) is not necessary to particularly switch the output from the enable/disable output unit (35d). However, since keeping the operations of all the motor control devices 3 to be in the same specification allows easier addition or reduction of the motor control device 3, the motor control device (3*d*) also desirably performs the operation similar to other motor control devices (3*a* to 3*c*).

Further, in the present embodiment, since the information communication lines 5 between the upper controller 2 and the motor control devices (3*a* to 3*d*) are formed by the cascade connection, the reset signal from the upper controller 2 to each of the motor control devices (3*a* to 3*d*) is performed in the order from most distant to the least distant information connection from the upper controller 2. In this case, the reset signal to the motor control device (3*d*) is first transmitted, and the transmission is performed in the order of the motor control device (3*c*), the motor control device (3*b*) and the motor control device (3*a*). However, when the information communication lines 5 are formed by the star connection, this order is not particularly limited, and the information communication may be simultaneous transmission.

Second Embodiment

Figure 5:
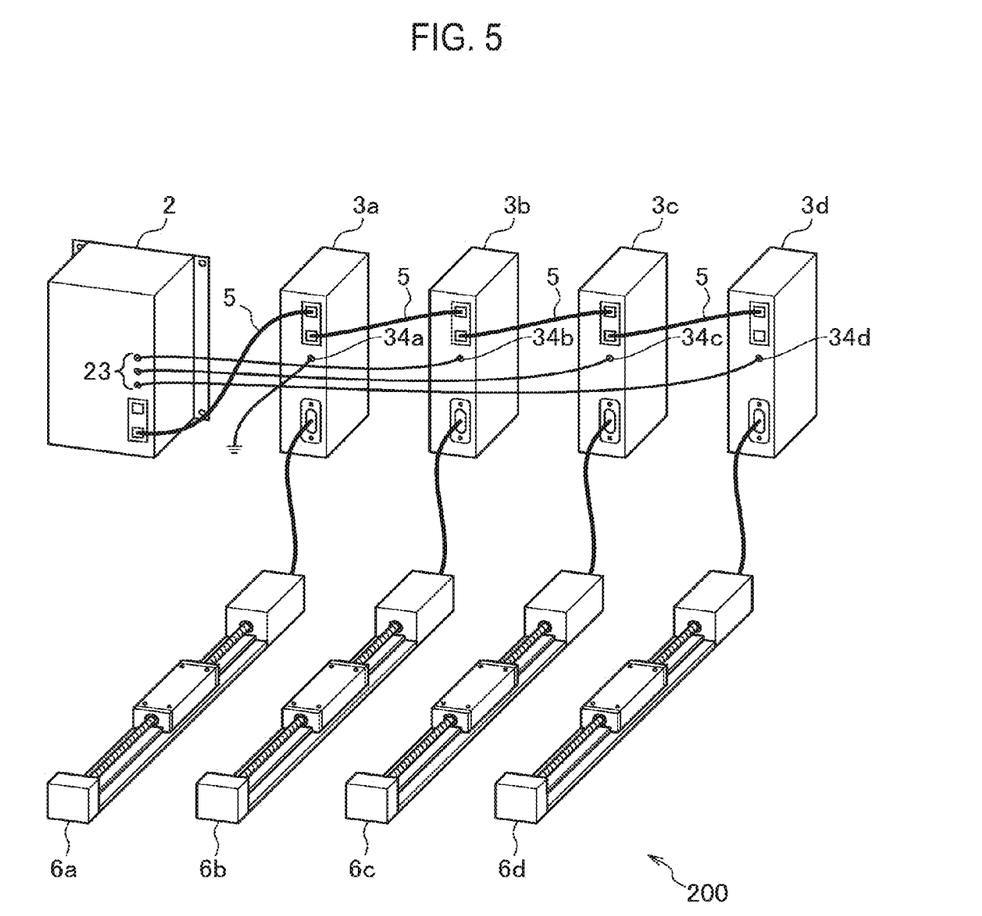
FIG. 5 is a diagram illustrating a motor control program transferring system according to a second embodiment of the present invention.

FIG. 5 is a diagram illustrating a motor control program transferring system 200 according to a second embodiment of the present invention. In the present embodiment, as illustrated, the motor control devices (3*a*, 3*b*, 3*c*, 3*d*) are cascade-connected to the upper controller 2 in this order by the information communication lines 5. Further, linear sliders (6*a* to 6*d*) driven by a servo motor are connected to the motor control devices (3*a* to 3*d*), respectively. Furthermore, the motor control devices (3*a* to 3*d*) include enable/disable input units (34*a* to 34*d*) respectively, the enable/disable input unit (34*a*) is grounded, and each of the enable/disable input units (34*b* to 34*d*) is connected to the enable/disable output unit 23 of the upper controller 2.

Here, each of the enable/disable input units (34*a* to 34*d*) is also an input port that accepts the input as to whether the information communication to the upper controller 2 is enabled or disabled, and that enables the information communication in a low-impedance. Therefore, the information communication of the motor control device 3*a* is enabled at all times. Further, since each of the enable/disable input units (34*b* to 34*d*) is connected to the enable/disable output unit 23, the enabling or disabling the information communication of the motor control devices (3*b* to 3*d*) is switched by the upper controller 2. That is, the upper controller 2 takes charge of the information communication switching unit 4 of FIG. 1 in the present embodiment. The outputs of the initial state of the enable/disable output unit 23 are all the high impedance.

The operation of the upper controller 2 of the present embodiment is described below with reference to FIG. 3. In the initial state, the information communication of the motor control devices (3*b* to 3*d*) is enabled for communication by the output from the upper controller 2. Further, by assigning the identification information to the single motor control device 3, the upper controller 2 switches the output to the enable/disable input units (34*b* to 34*d*) of the next single motor control device into the low impedance, that is, into the enabled communication. Here, the low impedance is output in the order (in the cascade connection, in the order from the closest to the farthest to upper controller 2) of the enable/disable input units (34*b*, 34*c*, 34*d*) each time the identification information is assigned. Accordingly, the upper controller 2 functions as the information communication switching unit 4 of FIG. 1.

Although the enable/disable input unit (34*a*) of the motor control device (3*a*) is grounded in the present embodiment, the enable/disable input unit (34*a*) may also be connected to the enable/disable output unit 23 of the upper controller 2. In this case, the low impedance is output to the enable/disable input unit (34*a*) in the initial state. The order of transmitting the reset signal from the upper controller 2, and the information communication lines 5 formed by the star connection are the same as in the previous embodiment.

Third Embodiment

Figure 6:
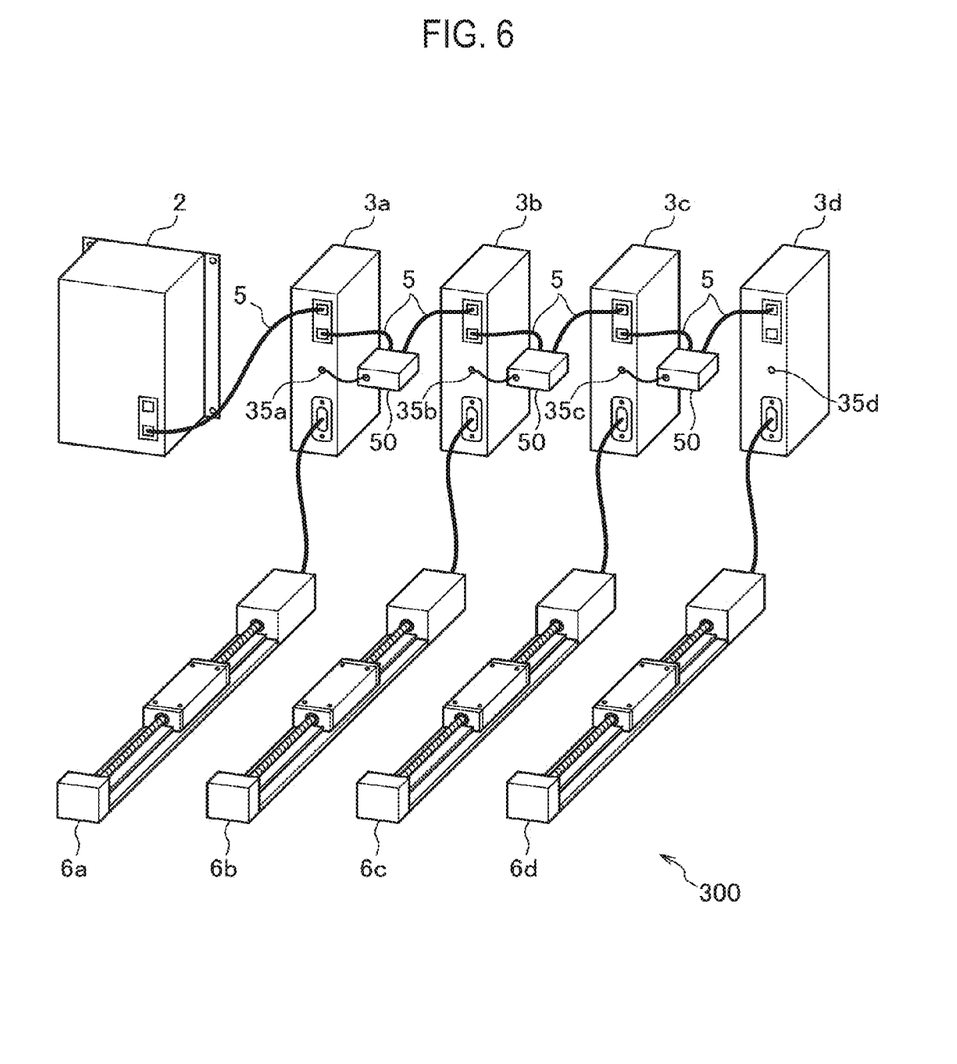
FIG. 6 is a diagram illustrating a motor control program transferring system according to a third embodiment of the present invention.

FIG. 6 is a diagram illustrating a motor control program transferring system 300 according to a third embodiment of the present invention. In the present embodiment, as illustrated, the motor control devices (3*a*, 3*b*, 3*c*, 3*d*) are cascade-connected to the upper controller 2 in this order by the information communication lines 5. Further, linear sliders (6*a* to 6*d*) driven by a servo motor are connected to the motor control devices (3*a* to 3*d*), respectively. Furthermore, the motor control devices (3*a* to 3*d*) include enable/disable output units (35*a* to 35*d*), respectively. Further, change-over switches 50 for switching whether to enable or disable the information communication depending on the input are respectively inserted into the information communication lines 5 between the motor control devices (3*a* to 3*d*), and the enable/disable output units (35*a* to 35*c*) of the motor control devices (3*a* to 3*c*) is respectively connected to the change-over switches 50 on the downstream side.

The change-over switch 50 enables the information communication by receiving the input of the low-impedance. Further, since the change-over switch 50 is not inserted into the information communication line 5 between the upper controller 2 and the motor control device (3*a*), the information communication between them is enabled at all times. Further, since the enable/disable output units (35*a* to 35*d*) are in a high impedance state in the initial state, the information communication in each change-over switch 50 is in a disabled state, that is, a disconnected state. Thus, whether the information communication of the motor control devices (3*b* to 3*d*) is to be enabled or disabled is switched by the adjacent motor control devices (3*a* to 3*c*) connected to the upper controller 2 side. That is, the motor control devices (3*a* to 3*c*) take charge of the information communication switching unit 4 of FIG. 1 in the present embodiment.

The operation of the motor control devices (3*a* to 3*d*) of the present embodiment is the same as in the first embodiment and is described below with reference to FIG. 3. In the initial state, the information communication of the motor control devices (3*b* to 3*d*) is disabled for communication by the output from the motor control devices (3*a* to 3*c*), respectively. Further, when the identification information is assigned by the upper controller 2, each of the motor control devices (3*a* to 3*d*) switches the output into the low impedance, that is, into the enabled communication. Thus, the motor control devices (3*a* to 3*c*) function as the information communication switching unit 4 of FIG. 1.

As in the first embodiment, the enable/disable output unit (35*d*) of the motor control device (3*d*) desirably performs the same operation as the other motor control devices (3*a* to 3*c*). Further, although a change-over switch 50 is not provided between the upper controller 2 and the motor control device (3*a*) in the present embodiment, the change-over switch 50 may be provided and its input may be grounded to enable the information communication at all times. Of course, the information communication lines 5 may be formed by a star connection in the present embodiment.

Further, when the information communication line 5 conforms to Ethernet (registered trademark) standard, the change-over switch 50 may be a so-called physical layer interface and its input signal may be an enable signal to the physical layer interface.

Fourth Embodiment

Figure 7:
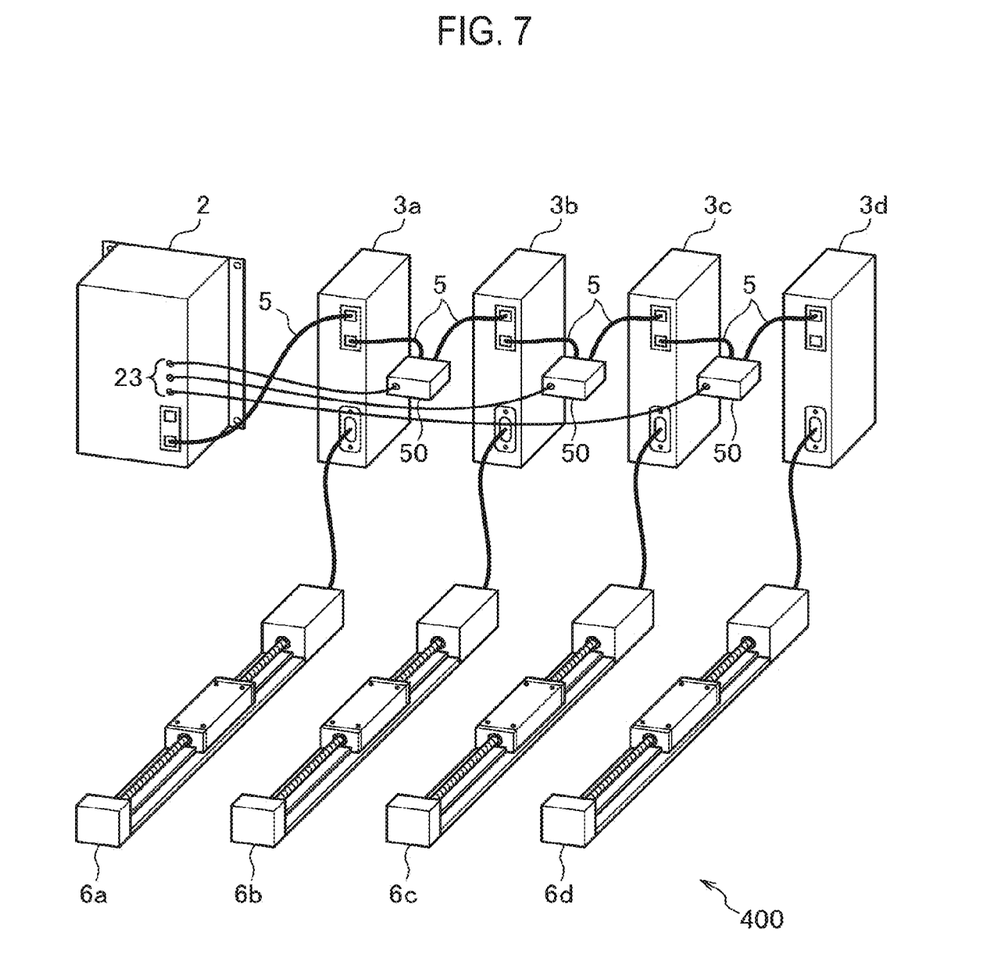
FIG. 7 is a diagram illustrating a motor control program transferring system according to a fourth embodiment of the present invention.

FIG. 7 is a diagram illustrating a motor control program transferring system 400 according to a fourth embodiment of the present invention. In the present embodiment, as illustrated, the motor control devices (3a, 3b, 3c, 3d) are cascade-connected to the upper controller 2 in this order by the information communication lines 5. Further, linear sliders (6a to 6d) driven by a servo motor are connected to the motor control devices (3a to 3d), respectively. Further, change-over switches 50 for switching whether to enable or disable the information communication depending on the input are respectively inserted into the information communication lines 5 between the motor control devices (3a to 3d), and are respectively connected to the enable/disable output unit 23 of the upper controller 2.

Here, the change-over switch 50 also enables the information communication by receiving the input of the low-impedance. Since the change-over switch 50 is not inserted into the information communication line 5 between the upper controller 2 and the motor control device (3a), the information communication of this time is enabled at all times. Further, since each change-over switch 50 is connected to the enable/disable output unit 23, whether the information communication of the motor control devices (3b to 3d) is enabled or disabled is switched by the upper controller 2. That is, the upper controller 2 takes charge of the information communication switching unit 4 of FIG. 1 in the present embodiment. The output of the initial state of the enable/disable output unit 23 is high impedance.

The operation of the upper controller 2 of the present embodiment is the same as in the second embodiment, and is described below with reference to FIG. 3. In the initial state, the information communication of the change-over switch 50 disabled for communication by the output from the upper controller 2. Further, when assigning the identification information to the single motor control device 3, the upper controller 2 switches the output to the change-over switch 50 in the next single motor control device into the low impedance, that is, into the enabled communication. Here, the change-over switches 50 provided on the upstream side correspond to the single motor control devices (3b, 3c, 3d). The upper controller 2 outputs the low impedance with respect to the change-over switches 50 of the motor control devices (3b, 3c, 3d) of the downstream side in this order (in the cascade connection, the order from the closest to the farthest to the upper controller 2) each time the identification information is assigned. Accordingly, the upper controller 2 functions as the information communication switching unit 4 of FIG. 1.

Further, even in this embodiment, a change-over switch 50 is not provided between the upper controller 2 and the motor control device (3a). However, as in the above-described embodiment, the change-over switch 50 may be provided and its input may be grounded to enable the information communication at all times. The order of transmitting the reset signal from the upper controller 2 is the same as in the above-described embodiment. Further, as in the above-described embodiment, the information communication lines 5 may be formed by a star connection, and the change-over switch 50 may be a so-called physical layer interface in Ethernet (registered trademark) standard.

A motor control program transferring system according to an embodiment of the present invention reduces a required amount of non-volatile memory and easily and automatically performs the transferring of the motor control program to each motor control device, when the motor control program is transferred to one or more motor control devices from an upper controller.

A motor control program transferring system according to one aspect of the present invention includes: an upper controller that includes a memory which stores a motor control program of a motor control device, an identification information assignment unit which repeatedly performs an operation of assigning unique identification information to the motor control device having specific initial identification information, and a motor control program transferring unit which transfers the motor control program to the motor control device to which the unique identification information is assigned; one or more motor control devices that is capable of communicating information with the upper controller, the motor control devices including a volatile memory which stores the motor control program, and an identification information retention unit which retains the identification information for identifying itself in a rewritable manner and retain the initial identification information in an initial state; and an information communication switching unit which enables the information communication of the single motor control device to the upper controller in an initial state and newly enable the information communication of the single motor control device to the upper controller each time the unique identification information is assigned to the motor control device.

In a motor control program transferring system according to an embodiment of the present invention, the upper controller can further include a reset signal transmission unit which transmits a reset signal to the motor control device after completion of the transferring of the motor control program using the motor control program transferring unit; and the motor control device further includes a reset signal reception unit which receives the reset signal and execute the motor control program stored in the volatile memory.

In a motor control program transferring system according to an embodiment of the present invention, the information communication between the upper controller and the motor control device can be performed by non-periodic communication before the transmission of the reset signal, and is performed by periodic communication after the transmission of the reset signal.

In a motor control program transferring system according to an embodiment of the present invention, the upper controller can include a communication condition adjustment unit which adjusts the communication condition of the periodic communication, at least depending on the configuration of the motor control program transferring system.

In a motor control program transferring system according to an embodiment of the present invention, the motor control program transferring unit can perform the retransferring of the motor control program when the transferring of the motor control program fails.

In a motor control program transferring system according to an embodiment of the present invention, the motor control device can include an enable/disable input unit which receives an input as to whether to enable or disable the information communication to the upper controller; and a signal for enabling the information communication can be input to the enable/disable input unit of the single motor control device, and one of the signals for enabling and disabling the information communication can be input to the enable/disable input unit of the other motor control device by the information communication switching unit.

In a motor control program transferring system according to an embodiment of the present invention, the motor control device can include an enable/disable output unit which outputs the signal to the enable/disable input unit; and the output from the enable/disable output unit of the single motor control device can be input to the enable/disable input unit of the other motor control device, and the enable/disable output unit can switch its output from the disabling to the enabling, by assigning the unique identification information to the motor to which the enable/disable output unit belongs.

In a motor control program transferring system according to an embodiment of the present invention, the upper controller can include an enable/disable output unit which outputs a signal to the enable/disable input unit; and the output from the enable/disable output unit can be input to an input port of the motor control device, and the enable/disable output unit can switch the output to the enable/disable input unit of the other motor control device from the disabling to the enabling, by assigning the unique identification information to the single motor control device.

A motor control program transferring system according to an embodiment of the present invention can further include: a change-over switch which switches whether to enable or disable the information communication with the upper controller depending on the input, for each of all the motor control devices or the motor control devices except for one, wherein the information communication of the single motor control device to the upper controller can be enabled, and in the information communication of the other motor control device to the upper controller, one of the signal for enabling or the signal for disabling the information communication from the information communication switching unit can be input to the change-over switch.

In a motor control program transferring system according to an embodiment of the present invention, the motor control device can include a enable/disable output unit which outputs a signal to the change-over switch; and the output from the enable/disable output unit of the single motor control device can be input to the change-over switch of the other motor control device, and the enable/disable output unit can switch its output from the disabled state to the enabled state, by assigning the unique identification information to the motor to which the enable/disable output unit belongs.

In a motor control program transferring system according to an embodiment of the present invention, the upper controller can include a enable/disable output unit which outputs a signal to the change-over switch, and the output from the enable/disable output unit can be input to the change-over switch, and the enable/disable output unit can switch the output to the change-over switch of the other motor control device from the disabled state to the enabled state, by assigning the unique identification information to the single motor control device.

An upper controller according to one aspect of the present invention includes a memory which stores a motor control program of a motor control device, an identification information assignment unit which repeatedly performs an operation of assigning unique identification information to the motor control device having specific initial identification information, and a motor control program transferring unit which transfers the motor control program to the motor control device to which the unique identification information is assigned.

A motor control device according to one aspect of the present invention includes: a volatile memory which stores a motor control program; and an identification information retention unit which retains identification information for identifying itself in a rewritable manner and retain specific initial identification information in an initial state.

A motor control program transferring method according to one aspect of the present invention includes repeatedly performing an operation of assigning unique identification information to a motor control device having specific initial identification information, transferring the motor control program to the motor control device to which the unique identification information is assigned, newly enabling the information communication of the single motor control device each time the unique identification information is assigned to the motor control device, and enabling the information communication of the single motor control device to the upper controller in an initial state, and newly enabling the information communication of the single motor control device to the upper controller, each time the unique identification information is assigned to the motor control unit.

According to an embodiment of the present invention, a required amount of non-volatile memory can be reduced, and the transferring of the motor control program to each motor control device can be easily and automatically performed, when the motor control program is transferred to one or more motor control devices from an upper controller.

Obviously, numerous modifications and variations of the present invention are possible in light of the above teachings. It is therefore to be understood that within the scope of the appended claims, the invention may be practiced otherwise than as specifically described herein.

The invention claimed is:

1. A motor control program transferring system, comprising:
    an upper control device including a memory storing a plurality of motor control programs that are respectively executable on a plurality of motor control devices, and circuitry configured to
    perform one or more assigning operations that respectively assign unique identification information to the plurality of motor control devices, the plurality of motor control devices each having initially designated identification information, and
    transfer the plurality of motor control programs to the respective plurality of motor control devices to which the respective unique identification information has been assigned;
    the plurality of motor control devices configured to communicate with the upper control device, the plurality of motor control devices each including a volatile memory storing the respective motor control program, and a storage retaining identification information that identifies the respective motor control device in a rewritable manner including initially retaining the respective initially designated identification information; and
    switching circuitry configured to enable communication between a first one of the plurality of motor control devices and the upper control device at least during an initial state and switch on communication between a second one of the plurality of motor control devices and the upper control device after a respective unique identification information is assigned to the first one of the plurality of motor control devices,
    wherein the circuitry of the upper control device is further configured to transmit a reset signal to the first one of the plurality of motor control devices after completion of the transferring of the plurality of motor control programs, and each of the plurality of motor control devices further includes a second circuitry configured to receive the reset signal and execute the respective motor control program stored in the respective volatile memory, and wherein the communication between the upper control device and the plurality of motor control devices is performed by non-periodic communication before transmission of the reset signal, and is performed by periodic communication after the transmission of the reset signal.

2. The motor control program transferring system according to claim 1, wherein the circuitry of the upper control device is further configured to adjust a communication condition of the periodic communication, at least, depending on a configuration of the motor control program transferring system.

3. The motor control program transferring system according to claim 1, wherein the circuitry of the upper control device is further configured to perform a retransferring of at least one of the plurality of motor control programs when the transferring of the at least one of the plurality of motor control programs fails.

4. The motor control program transferring system according to claim 1, wherein each of the plurality of motor control devices further includes an enable/disable input port configured to receive at least one signal instructing switching on or switching off of communication with the upper control device, a first signal enabling communication is input to a respective enable/disable input port of the first one of the plurality of motor control devices, and a second signal enabling communication is input to a respective enable/disable input port of the second one of the plurality of motor control devices by the switching circuitry.

5. The motor control program transferring system according to claim 4, wherein each of the plurality of motor control devices includes an enable/disable output port configured to output at least one signal to an enable/disable input port of another one of the plurality of motor control devices, and the second signal output from a first enable/disable output port of the first one of the plurality of motor control devices is input to the second enable/disable input port of the second one of the plurality of motor control devices, and a second enable/disable output port is configured to switch from disabled to enabled, after the respective unique identification information is assigned to the second one of the plurality of motor control devices.

6. The motor control program transferring system according to claim 4, wherein the upper control device further includes an enable/disable output port configured to output at least one signal to at least one enable/disable input port of the plurality of motor control devices, and the second signal output from the enable/disable output port of the upper control device is input to the second enable/disable input port of the second one of the plurality of motor control devices, and a second enable/disable output port of the upper control device is configured to output a third signal to a third enable/disable input port of a third one of the plurality of motor control devices after enabling the second one of the plurality of motor control and assigning the respective unique identification information to the second one of the plurality of motor control devices.

7. The motor control program transferring system according to claim 1, further comprising:

a plurality of change-over switches configured to switch on or switch off communication between at least one of the plurality of motor control devices and the upper control device depending on an input to the plurality of change-over switches, wherein the at least one of the plurality of motor control devices includes all of the plurality of motor control devices or all of the plurality of motor control devices except for one, communication between the first one of the plurality of motor control devices and the upper control device is enabled, and communication between the second one of the plurality of motor control devices and the upper control device is switched on or switched off according to a first signal transmitted from the switching circuitry that is received by a first change-over switch of the second one of the plurality of motor control devices.

8. The motor control program transferring system according to claim 7, wherein each of the plurality of motor control devices includes an enable/disable output port configured to output at least one signal to a change-over switch of the plurality of change-over switches, the first signal output from a first enable/disable output port of the first one of the plurality of motor control devices is received by the first change-over switch, and a second enable/disable output port of the second one of the plurality of motor control devices is configured to switch from disabled to enabled, after the respective unique identification information is assigned to the second one of the plurality of motor control devices.

9. The motor control program transferring system according to claim 7, wherein the upper control device includes an enable/disable output port configured to output at least one signal to each change-over switch of the plurality of change-over switches, and the first signal output from an enable/disable output port of the upper control device is received by the first change-over switch, and a second enable/disable output port of the second one of the plurality of motor control devices is configured to switch from disabled to enabled, after the respective unique identification information is assigned to the second one of the plurality of motor control devices.

10. An upper controller for communicating with a plurality of motor control devices, comprising:

a memory storing a plurality of motor control programs that are respectively executable on the plurality of motor control devices; and circuitry configured to perform one or more assigning operations that respectively assign unique identification information to the plurality of motor control devices, the plurality of motor control devices each having initially designated identification information, and transfer the plurality of motor control programs to the respective plurality of motor control devices to which the respective unique identification information have been assigned, and transmit a reset signal to the first one of the plurality of motor control devices after completion of the transferring of the plurality of motor control programs, wherein the communication between the upper control device and the plurality of motor control devices is performed by non-periodic communication before transmission of the reset signal, and is performed by periodic communication after the transmission of the reset signal.

11. A motor control program transferring method, comprising:

performing an operation of assigning unique identification information to a plurality of motor control devices each having initially designated identification information;

switching on communication for remaining ones of the plurality of motor control devices after the assigning of the respective unique identification information to each of the remaining one of the plurality of motor control devices, a first one of the plurality of control devices having communication initially enabled;

transferring a plurality of motor control programs to the respective plurality of motor control devices to which the respective unique identification information has been assigned; and transmitting a reset signal to the first one of the plurality of motor control devices after completion of the transferring of the plurality of motor control programs, wherein the communication between the upper control device and the plurality of motor control devices is performed by non-periodic communication before transmission of the reset signal, and is performed by periodic communication after the transmission of the reset signal.

* * * * *